(12) United States Patent
Ehrat et al.

(10) Patent No.: US 6,344,511 B1
(45) Date of Patent: *Feb. 5, 2002

(54) ULTRA-FINE-GRAINED THERMOPLASTICS

(75) Inventors: Rainer Ehrat, Schaffhausen (CH); Hanns Watrinet, Benton, KY (US)

(73) Assignee: Alusuisse Technology & Management Ltd. (CH)

( * ) Notice: Subject to any disclaimer, the term of this patent is extended or adjusted under 35 U.S.C. 154(b) by 0 days.

This patent is subject to a terminal disclaimer.

(21) Appl. No.: 09/328,563

(22) Filed: Jun. 9, 1999

Related U.S. Application Data

(62) Division of application No. 08/695,854, filed on Aug. 9, 1996, now Pat. No. 5,994,443.

(51) Int. Cl.[7] .............................. C08J 5/10; C08K 3/26; C08L 23/00
(52) U.S. Cl. ........................ 524/425; 524/436; 524/437; 524/430
(58) Field of Search ................................ 524/430, 437, 524/436, 425

(56) References Cited

U.S. PATENT DOCUMENTS

| | | | | |
|---|---|---|---|---|
| 4,014,956 A | * | 3/1977 | Smith et al. ................. | 260/853 |
| 4,123,488 A | * | 10/1978 | Lawson ....................... | 264/135 |
| 4,250,222 A | * | 2/1981 | Marvel et al. .............. | 428/285 |
| 5,162,170 A | * | 11/1992 | Miyabayashi et al. ........ | 429/94 |

* cited by examiner

*Primary Examiner*—James J. Seidleck
*Assistant Examiner*—U. K. Rajguru
(74) *Attorney, Agent, or Firm*—Bachman & LaPointe, P.C.

(57) ABSTRACT

Ultra-fine-grained thermoplastics such as polyolefins, for example, having an average particle size $D_{50}$ of less than 400 μm and are present in a mixture along with a filler where the amount of filler material in the mixture amounts to 40 to 90% with respect to the mixture. As such ultra-fine-grained thermoplastics cannot be obtained by means of the normal milling process of if so then only with considerable expenditure, the process for manufacturing ultrafine-grained thermoplastics is performed in such a manner that a mixture containing 10 to 60 wt. % thermoplastics with respect to the mixture and 40 to 90 wt.% filler material with respect to the mixture is ground e.g. in an impact pulverizer, as a result of which thermoplastic particles with an average particle size $D_{50}$ less than 400 μm are produced.

10 Claims, No Drawings

ULTRA-FINE-GRAINED THERMOPLASTICS

This is a Division, of application Ser. No. 08/695,854, filed Aug. 9, 1996 now U.S. Pat. No. 5,994,443.

The present invention relates to ultra-fine-grained thermoplastics in ground particulate form.

BACKGROUND OF THE INVENTION

It is known to employ thermoplastics in fine to ultra-fine-grained particulate form for various purposes. An ultra-fine-grained form is desired if the thermoplastics have to be mixed as homogeneously as possible with other substances. As the thermoplastics very often represent the more expensive component in the mixture, or the thermoplastic is only an additive but not the active ingredient, or the properties of the thermoplastics have to be modified, an effort is made to employ as little as possible of the thermoplastics in the mixture in question.

Thermoplastics cannot be readily divided into a finely divided form by grinding, or if so only at great expense, and it is not possible to achieve average particle sizes smaller than 400 $\mu$m. Heat is released during the grinding process and the thermoplastics, depending on their type, in particular those with adhesive or low melting point characteristics, are immediately impossible to grind down. As a means of avoiding this problem, it is known to employ cryogenic grinding processes. The material to be ground is cooled by liquefied nitrogen whereby it becomes brittle and is subjected to grinding in this cooled state. Also this process is limited with respect to particle fineness, and the yield is poor.

Precipitation processes are employed to produce thermoplastics, such as polyolefins for example, in a finer grained form than is achievable by grinding. These processes which enable thermoplastics to be produced in an ultra-fine form are multi-stage processes with long cycle times and also emissions and large amounts of residual chemicals such as contaminated precipitation medium or residual solvents. Consequently, products made by precipitation methods are expensive. Furthermore, various polymers are not suitable for producing in an ultra-fine powder form using precipitation processes.

SUMMARY OF THE INVENTION

The object of the present invention is to provide ultra-fine-grained thermoplastics in ground particulate form and a process for their manufacture. The process should be simple and cost-favorable and the products should contain the thermoplastics in the desired particle sizes.

These objectives are achieved by way of the invention in that the thermoplastics exhibit an average particle size $D_{50}$ of less than 400 $\mu$m and are present in a mixture along with a filer where the amount of filler material in the mixture amounts to 40 to 90%.

Preferred are thermoplastics exhibiting an average particle size of 1 to 400 $\mu$m, especially preferred is from 10 to 300 $\mu$m, usefully from 80 to 200 $\mu$m and especially from 80 to 120 $\mu$m.

DETAILED DESCRIPTION OF PREFERRED EMBODIMENTS

For example, thermoplastics of the polyolefin type are usefully employed. Examples of polyolefins are polyethylene, polyethylene of high density (HDPE, density greater than 0.944 g/cm$^3$), polyethylene of medium density (MDPE, density 0.926–0.940 g/cm$^3$), linear polyethylene of medium density (LMDPE, density 0.926–0.940 g/cm$^3$), polyethylene of low density (LDPE, density 0.910–0.925 g/cm$^3$), and linear polyethylene of low density (LLDPE, density 0.916–0.925 g/cm$^3$), polyproplyene, isotactic or atactic polypropylene, crystalline or amorphous polypropylene or mixtures thereof, poly-1-butene, poly-3-methyl-butene, poly-4-methylpentene. Further examples are copolymers or coextrudates of the above mentioned polyolefins and ionomeric resins such as e.g. those of polyethylene with vinyl-acetate (EVA) or acrylic acid, or e.g. ionomeric resins such as copolymers of ethylene with about 11% acrylic acid, methacrylic acid, acrylic esters, tetra-fluorethylene or propylene, and also static copolymers, block copolymers or olefinpolymer-elastomer mixtures or ter-polymers e.g. ethylene-propylene-dien-caoutchouc (EDPM) or acrylnitril-butadiene-rubber/ polypropylene (NBR/PP). Preferred are polyethylenes and polypropylenes.

Especially preferred are low density polyethylene, linear low density polyethylene, high density polyethylene, ethylene-vinylacetate-copolomers (EVA), ethylene-acrylic-acid-acrylic-acid ester-terpolymers (EAA) or ethylene-acrylic-acid-maleic-acid-anhydride terpolymers (EEAMA).

Advantageous are elastic and adhesive forms of polymers and in particular polyolefins, as thermoplastic elastomers such as EPDM, NBR polyisoprene or if desired natural rubber.

The filler material may be of a pure substance or a mixtures of substances. The filler material or filler material mixture may contain substances from the following examples or be comprised of such substances.

Useful are filler materials containing or comprising the hydroxides, carbonates or oxides of aluminum, magnesium or calcium or mixtures thereof. Other filler materials are fillers of an inorganic or mineral nature from the series: talcum, vermiculite, perlite, mica, glasses, clays, silica, calcium sulphate, chalk, titanium dioxide, silicates, quartz, soot, graphite, metal powders such as e.g. Fe, Ni, Cr, Al, Cu, Zn etc., or mixtures containing the above-mentioned filler materials or comprising the above-mentioned filler materials.

To the filler materials mentioned may be included also pigments such as inorganic or organic pigments. Examples of inorganic pigments are chalk, ochre, umber, green earth, graphite from the series of natural occurring pigments. Examples of synthetic inorganic pigments are white, black, colored and shiny pigments from the series including titanium white, lead white, zinc white, soot, iron oxide black, manganese black, lead chromate, red lead oxide, cobalt blue, ultramarine and others.

Examples of organic pigments are, apart from e.g. the naturally occurring bone black and indigo, the synthetic azo pigments, dioxazine, chinacridon, phtalocyanine, isoindolinon, perlene and perinon, metal complex and alkali blue pigments.

Examples of organic filler materials are cellulose type products such as wood powder, natural fibers, wool, cotton, flax, hemp, Chinese cane or synthetic fibers.

The mixture according to the present invention may also contain other additives or additions such as stabilizers, anti-oxidants, softeners, lubricants, emulsifiers, antistatic agents, swelling agents, combustion inhibitors, so called modifiers, etc. The amount of additive or additions may for example range from 0.001 to 10 wt. % with respect to the above-mentioned mixture of thermoplastic and filler.

Preferred filler materials are the hydroxides and carbonates of aluminum, magnesium and calcium and namely Al(OH)$_3$, Mg(OH)$_2$, Ca(OH)$_2$, MgCO$_3$ and CaCO$_3$.

The filler materials employed usefully exhibit an average particle size of 0.1 to 200μm, preferably 1 to 100 μm.

In accordance with the invention the filler material content amounts to 40 to 90 wt. % with respect to the mixture of thermoplastic and filler. Advantageously, the filler material content is 50 to 75 wt. % with respect to the mixture. Correspondingly, the fraction of thermoplastic with respect to the mixture lies at 10 to 60 wt. %, advantageously at 25 to 50 wt. % with respect to the mixture.

The process according to the invention for manufacturing the ultra-fine thermoplastics in ground particulate form is performed such that a mixture containing the thermoplastics, comprising 10 to 60 wt. % of the final mixture, and the filler materials, comprising 40 to 90 wt. % of the final mixture, are ground in an impact pulverizer to an average particle size for the thermoplastics $D_{50}$ of 400 μm and less.

For example the thermoplastics are preferably ground to an average particle size of 1 to 400 μm, especially preferably to 10 to 300 μm and advantageously to 80 to 200 μm and in particular to 180 to 120 μm.

The thermoplastics and fillers in general, and the preferred forms thereof, which are ground in mixture form are described in the following.

The components of the mixtures such as the thermoplastics and the fillers and, according to the case in question also further additives, may be compounded or granular. Further, the components of the mixture may be fed to a mixing facility such as an internal mixer or a twin screw extruder or a single screw extruder or kneader and processed into a homogeneous compounded mass. Masses made this way may e.g. be subjected to a pre-dividing step in a cutting mill.

As a rule the thermoplastic is melted and mixed with the filler materials e.g. in an extrusion or internal mill and, according to the case in question, the additives mixed in and granulated in the plastic state.

Immediately after compounding, it is useful to form a granulate e.g. by strand granulation, hot precipitation, underwater granulating or band granulating.

If desired, granulating agents such as water and/or lubricants may be added.

The components of the compounded masses may be subjected to the actual grinding process as coarsely ground material or as previously prepared granulate. Impact pulverizers are employed for this grinding process, e.g. conventional impacting pulverizers, hammer mills, impact plate pulverizers, pinned-disk mills, beating mills or peening mills.

Preferred are beating mills, hammer mills, impact plate mills or pinned-disk mills.

During the grinding process the mill and/or as desired the material being ground may be cooled. The cooling medium may be in the form of gases, in particular air or nitrogen, liquids such as water, brine or liquid nitrogen. As a rule it suffices to keep the temperature of the material being ground at room temperature or e.g. at temperatures of –10 to 40° C. or usefully from 10 to 30° C. and in particular from 15 to 25° C.

The products from the grinding process are therefore the thermoplastics pulverized to the desired size in a mixture along with the filler material or mixture of filler materials.

As the thermoplastics are normally not used alone but e.g., exploiting the adhesive, softening or sintering properties, fabricated along with the filler materials into shapes of various forms, the mixture represents in fact an intermediate or even an end product.

It has also been found that these ultra-fine thermoplastics may be selected with a much larger particle size when incorporated in the mixture e.g. 1.1 to 5 times larger, than would be possible using a pure thermoplastic according to the present state-of-the-art.

After the grinding, the filler material may, if desired, be separated from the ultra-fine thermoplastics by dissolution or by chemical reaction.

For example, the ultra-fine thermoplastic may be employed in the form of a mixture with the filler as a binding agent for highly filled molding materials. Pure thermoplastics may often not be employed because of the combustion behavior, thermal properties, mechanical properties or because of the price. For that reason efforts are made to replace the thermoplastics with larger quantities of e.g. cheaper or non-combustible fillers. A larger fraction of filler material reduces the cohesion of a molding material itself or also between the molding material and the other materials in contact with it. As a result of the ultra-fine thermoplastic particles that can be achieved by way of the invention, these thermoplastic particles exhibit a high degree of homogeneity in the mixture with the filler material. Consequently, a molding material is achieved th a t exhibits excellent strength within itself and also between such a molding material and a further material in contact with it, e.g. after extrusion or sintering, The same advantages are obtained e.g. when using pigments such as colored pigments as filler materials. On using the ultra-fine thermoplastics in mixtures along with pigments as filler material high grade powders for powder coating are obtained. Another application for the ultra-fine particulate thermoplastics according to the invention lies in the field of electrodes for batteries.

What is claimed is:

1. Ultra-fine-grained thermoplastics in ground particulate form as a molding material, wherein said thermoplastics comprise at least one ground thermoplastic material in mixture with a simultaneously ground filler wherein said thermoplastic is an ultra-fine-grained thermoplastic which exhibits an average particle size $D_{50}$ of less than 400 μm and is present in a mixture along with said simultaneously ground filler where the amount of filler material in the mixture amounts to 40 to 90%.

2. Ultra-fine-grained thermoplastics according to claim 1, wherein said thermoplastic exhibits an average particle size of 80 to 200 μm.

3. Ultra-fine-grained thermoplastics according to claim 1, wherein said thermoplastic exhibits an average particle size of 80 to 120 μm.

4. Ultra-fine-grained thermoplastics in ground particulate form as a molding material, wherein said thermoplastics comprise at least one ground thermoplastic material in mixture with a simultaneously ground filler wherein said thermoplastic is an ultra-fine-grained thermoplastic which exhibits an average particle size $D_{50}$ of less than 400 μm and is present in a mixture along with said simultaneously ground filler where the amount of filler material in the mixture amounts to 40 to 90%, and wherein said thermoplastic is polyolefins or polyolefin-containing thermoplastics.

5. Ultra-fine-grained thermoplastics in ground particulate form as a molding material, wherein said thermoplastics comprise at least one ground thermoplastic material in mixture with a simultaneously ground filler wherein said thermoplastic is an ultra-fine-grained thermoplastic which exhibits an average particle size $D_{50}$ of less than 400 μm and is present in a mixture along with said simultaneously ground filler where the amount of filler material in the mixture amounts to 40 to 90%, and wherein the filler materials contain at least one of hydroxides, carbonates and oxides of at least one of aluminum, magnesium and calcium, and mixtures thereof.

6. Ultra-fine-grained thermoplastics in ground particulate form as a molding material, wherein said thermoplastics comprise at least one ground thermoplastic material in mixture with a simultaneously ground filler wherein said thermoplastic is an ultra-fine-grained thermoplastic which exhibits an average particle size $D_{50}$ of less than 400 $\mu$m and is present in a mixture along with said simultaneously ground filler where the amount of filler material in the mixture amounts to 40 to 90%, and wherein said filler materials exhibit an average particle size of 0.1 to 200 $\mu$m.

7. Ultra-fine-grained thermoplastics in ground particulate form as a molding material, wherein said thermoplastics comprise at least one ground thermoplastic material in mixture with a simultaneously ground filler wherein said thermoplastic is an ultra-fine-grained thermoplastic which exhibits an average particle size $D_{50}$ of less than 400 $\mu$m and is present in a mixture along with said simultaneously ground filler where the amount of filler material in the mixture amounts to 40 to 90%, and wherein said mixture includes at least one additional additive in an amount of 0.001 to 10 wt. %.

8. Ultra-fine-grained thermoplastics in ground particulate form as a molding material, wherein said thermoplastics comprise at least one ground thermoplastic material in mixture with a simultaneously ground filler wherein said thermoplastic is an ultra-fine-grained thermoplastic which exhibits an average particle size $D_{50}$ of less than 400 $\mu$m and is present in a mixture along with said simultaneously ground filler where the amount of filler material in the mixture amounts to 40 to 90%, and wherein said mixture is ground at temperatures of −10 to 40° C.

9. Ultra-fine-grained thermoplastics in ground particulate form as a molding material, wherein said thermoplastics comprise at least one ground thermoplastic material in mixture with a simultaneously ground filler wherein said thermoplastic is an ultra-fine-grained thermoplastic which exhibits an average particle size $D_{50}$ of less than 400 $\mu$m and is present in a mixture along with said simultaneously ground filler where the amount of filler material in the mixture amounts to 40 to 90%, and wherein said filler material is a colored pigment.

10. Ultra-fine-grained thermoplastics in ground particulate form as a molding material, wherein said thermoplastics comprise at least one ground thermoplastic material in mixture with a simultaneously ground filler wherein said thermoplastic is an ultra-fine-grained thermoplastic which exhibits an average particle size $D_{50}$ of less than 400 $\mu$m and is present in a mixture along with said simultaneously ground filler where the amount of filler material in the mixture amounts to 40 to 90%, and wherein said filler is a mixture of filler materials.

* * * * *